(12) United States Patent
Guillotel et al.

(10) Patent No.: US 10,536,718 B2
(45) Date of Patent: Jan. 14, 2020

(54) METHOD AND DEVICE FOR ENCODING AND DECODING A LIGHT FIELD BASED IMAGE, AND CORRESPONDING COMPUTER PROGRAM PRODUCT

(71) Applicant: THOMSON Licensing, Issy-les-Moulineaux (FR)

(72) Inventors: Philippe Guillotel, Vern sur Seiche (FR); Dominique Thoreau, Cesson Sévigné (FR); Benoit Vandame, Betton (FR); Patrick Lopez, Livré sur Changeon (FR); Guillaume Boisson, Pleumeleuc (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 1 day.

(21) Appl. No.: 15/757,417

(22) PCT Filed: Sep. 5, 2016

(86) PCT No.: PCT/EP2016/070886
§ 371 (c)(1),
(2) Date: Mar. 5, 2018

(87) PCT Pub. No.: WO2017/042133
PCT Pub. Date: Mar. 16, 2017

(65) Prior Publication Data
US 2018/0249178 A1     Aug. 30, 2018

(30) Foreign Application Priority Data
Sep. 7, 2015    (EP) .................................... 15306363

(51) Int. Cl.
*H04N 19/597*    (2014.01)
*H04N 19/105*    (2014.01)
(Continued)

(52) U.S. Cl.
CPC ......... *H04N 19/597* (2014.11); *H04N 13/117* (2018.05); *H04N 13/161* (2018.05);
(Continued)

(58) Field of Classification Search
CPC .. H04N 19/105; H04N 19/136; H04N 19/169; H04N 19/179; H04N 19/182;
(Continued)

(56) References Cited

U.S. PATENT DOCUMENTS

2008/0131019 A1    6/2008  Ng
2013/0010067 A1*   1/2013  Veeraraghavan ...... G01B 11/22
                                                          348/46

(Continued)

OTHER PUBLICATIONS

Roodaki-Lavasani et al., "Efficient burst image compression using H.265/HEVC", IS&T/SPIE Electronic Imaging, San Francisco, California, USA, Feb. 18, 2014, pp. 1-9.
(Continued)

*Primary Examiner* — Dominic D Saltarelli
(74) *Attorney, Agent, or Firm* — Brian J. Dorini, Esquire; Robert D. Shedd, Esq.

(57) ABSTRACT

A method for encoding a current focal stack is disclosed that comprises a set of images focused at a different focalization distance from one image to another. According to present disclosure, the method comprises: —encoding (31) information representing an image of the current focal stack, the image being selected in said current focal stack according to an image sharpness criterion, and reconstructing the image into a reconstructed image; —encoding (32) at least another image of the current focal stack by prediction from at least the reconstructed image.

20 Claims, 5 Drawing Sheets

(51) Int. Cl.
   *H04N 19/162*   (2014.01)
   *H04N 19/172*   (2014.01)
   *H04N 19/117*   (2014.01)
   *H04N 13/117*   (2018.01)
   *H04N 13/161*   (2018.01)

(52) U.S. Cl.
   CPC ......... *H04N 19/105* (2014.11); *H04N 19/162* (2014.11); *H04N 19/172* (2014.11)

(58) Field of Classification Search
   CPC .... H04N 19/46; H04N 19/597; H04N 19/162; H04N 19/172; H04N 19/117; H04N 19/161
   USPC ........................................ 375/240.02, 240.08
   See application file for complete search history.

(56) References Cited

U.S. PATENT DOCUMENTS

2014/0267618 A1   9/2014   Esteban et al.
2015/0062370 A1   3/2015   Shroff et al.

OTHER PUBLICATIONS

Solh, M., "Real-time Focal Stack Compositing for Handheld Mobile Cameras", IS&T/SPIE Electronic Imaging, San Francisco, California, USA, Mar. 7, 2014, pp. 1-6.

\* cited by examiner

METHOD AND DEVICE FOR ENCODING AND DECODING A LIGHT FIELD BASED IMAGE, AND CORRESPONDING COMPUTER PROGRAM PRODUCT

This application claims the benefit, under 35 U.S.C. § 365 of International Application PCT/EP2016/070886, filed Sep. 5, 2016, which was published in accordance with PCT Article 21(2) on Mar. 16, 2017, in English, and which claims the benefit of European Patent Application No. 15306363.1, filed Sep. 7, 2015.

1. TECHNICAL FIELD

The present disclosure relates to light field imaging, and to technologies for acquiring and processing light field data. More precisely, the present disclosure generally relates to a method and an apparatus for encoding and decoding a light field based image, and finds applications in the domain of image or video encoding/decoding (i.e. image or video compression/decompression).

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representing an amount of light that reaches a photosensor (or photodetector) within the device. However, this 2-D image contains no information about the directional distribution of the light rays that reach the photosensor (which may be referred to as the light field). Depth, for example, is lost during the acquisition. Thus, a conventional capture device does not store most of the information about the light distribution from the scene.

Light field capture devices (also referred to as "light field data acquisition devices") have been designed to measure a four-dimensional (4D) light field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light field capture device is referred to as the light field data. Light field capture devices are defined herein as any devices that are capable of capturing light field data. There are several types of light field capture devices, among which:
  plenoptic devices, which use a microlens array placed between the image sensor and the main lens, as described in document US 2013/0222633;
  a camera array, where each camera image onto its own image sensor.

The light field data may also be simulated with Computer Generated Imagery (CGI), from a series of 2-D images (called views when two differing images representing a same scene are captured with different viewing points) of a scene each taken from a different viewpoint by the use of a conventional handheld camera.

Light field data processing comprises notably, but is not limited to, generating refocused images of a scene, generating perspective views of a scene, generating depth maps of a scene, generating extended depth of field (MOE) images, generating stereoscopic images, and/or any combination of these.

The present disclosure focuses more precisely on light field based image captured by a plenoptic device as illustrated by FIG. 1 disclosed by R. Ng, et al. in "*Light field photography with a hand-held plenoptic camera*" Standford University Computer Science Technical Report CSTR 2005-02, no. 11 (April 2005).

Such plenoptic device is composed of a main lens (11), a micro-lens array (12) and a photo-sensor (13). More precisely, the main lens focuses the subject onto (or near) the micro-lens array. The micro-lens array (12) separates the converging rays into an image on the photo-sensor (13) behind it.

Contrary to the plenoptic device, camera array devices, such as the Pelican Imaging® camera, deliver directly matrices of views (i.e. without de-mozaicing).

Generally, the four-dimensional (4D) light field is processed by using a focal stack, which comprises a collection of images each of them being focused at a different focalization distance. Such a focal stack allows a user to change a focal point of the images by post-processing.

Dataset of the light field image or video (whether acquired by a plenoptic camera, a camera array or simulated with Computer Generated Imagery (CGI)) is reorganized to form a light data volume in the vicinity of the focal plane of a front lens similar to the light field generated by a lens in the vicinity of its focal plane. Such a focal stack 100 is schematically illustrated in FIG. 2.

A conventional focusing with a camera is simulated by selecting one of the images 101, 102, 103 within the focal stack 100, which corresponds to moving the focalization plane perpendicularly to the main optical axis z of the camera.

Among the many new light-field imaging functionalities provided by these richer sources of data, is the ability to manipulate the content after it has been captured; these manipulations may have different purposes, notably artistic, task-based and forensic. For instance, it would be possible for users to change, in real time, focus, field of depth and stereo baseline, as well as the viewer perspective. Such media interactions and experiences are not available with conventional imaging formats that would be obtained by using the conventional standard image or video codecs to encode/decode light field based images.

Moreover, an AIF (All In Focus) image may be generated by focus fusion: the in-focus region is detected in each focal stack image, then all these in-focus regions are fused to form an AIF image.

State of Art methods for encoding such light field based images consists in using standard image or video codecs (such as JPEG, JPEG-2000, MPEG4 Part 10 AVC, HEVC). However, such standard codecs are not able to take into account the specificities of light field imaging (aka plenoptic data), which records the amount of light (the "radiance") at every point in space, in every direction.

Indeed, applying the conventional standard image or video codecs (such as JPEG, JPEG-2000, MPEG4 Part 10 AVC, HEVC) delivers conventional imaging formats.

In particular, using traditional inter-frame encoding schemes results in a plenoptic view being encoded using information from its past, future, or temporally neighbouring image (from the same point of view) without taking into account of the knowledge provided by other views (taken from other points of view).

As an alternative, using multiview encoding methods, such as MPEG MVC, consists in obtaining prediction from one view to another, but is not suitable to encode the depth provided by the 4D light field.

As a consequence, after the decoding of 4D light field data encoded with traditional standard image or video codecs, the reconstruction of plenoptic images may be inaccurate. Obtaining the AIF image from such data may thus be impossible.

It would hence be desirable to provide a technique for encoding/decoding light field based images that would avoid at least one drawback of the prior art.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for encoding a current focal stack comprising a set of images focused at a different focalization distance from one image to another.

Such method comprises:
encoding information representing an image of the current focal stack, the image comprising the highest number of pixels in focus, and reconstructing the image into a reconstructed image;
encoding at least another image of the current focal stack by prediction from at least the reconstructed image.

In one embodiment of the disclosure, when the number of pixels in focus in several images comprised in the focal stack are closed, and beyond (or greater than) a threshold, it is possible to use one of these image for encoding purpose instead of the use of the image with the highest number of pixels in focus.

It should also be noted that the number of pixel in focus is related to an image sharpness criterion. Indeed, when elements/portions of an image are in focus, they appear to be sharp (i.e. not blurred). Therefore, in order to determine the number of pixels in focus, one skilled in the art could use one of the techniques described in the article "*Sharpness Estimation for Document and Scene Images*" by J. Kumar et al., or in the article "A new No-Reference Image quality Measure for Blurred Images in Spatial Domain" by K. De and Masilamani V., or in the article "*Sharpness Measure: Towards Automatic Image Enhancement*" by D. Shaked and I. Tastl, or in the article "*A Fast Wavelet-Based Algorithm for Global and Local Image Sharpness Estimation*" by P. V. Vu and D. M. Chandler. These techniques are either based on frequency content analysis, or edge-width among other criteria. Hence, in one embodiment of the disclosure, it is not necessary to determine explicitly the number of pixels in focus. Indeed, a sharpness estimator can be used for selecting an image in the focal stack, according to its value compared to the others associated with the images. For example, for each of the images in a focal stack, a sharpness index can be determined (as for example in the previously mentioned article "*A Fast Wavelet-Based Algorithm for Global and Local Image Sharpness Estimation*"). In one embodiment of the disclosure, the image having the highest sharpness index value is selected for being the base image for prediction purpose. In another embodiment of the disclosure, when several sharpness index values are greater than a threshold, and are close to each other, then each of these images can be used as a base image for prediction purpose.

Hence, one skilled in the art could use a sharpness criterion for selecting an image in the focal stack. In the following, the description only focuses on the use of the number of pixels in focus as a criterion for selecting a reference image in the focal stacks. However, as mentioned previously, such selection can be done according to an image sharpness criterion. Thus, when the highest number of pixels in focus is used as a selection criterion, it could be replaced by another image sharpness criterion. Moreover, as mentioned previously, the highest it not always used: images having a number of pixels in focus that is greater than a threshold could be used as reference image.

The present disclosure thus relies on a novel and inventive approach for encoding a current focal stack comprising a set of images of a same scene, captured with a same viewing point, and focused at a different focalization distance from one image to another, the focal stack being obtained from light-field data associated with the scene.

Actually, the present disclosure benefits from the specific properties of a focal stack, whose main advantage compared to matrix of light-field raw images is that it is easy to change the focus point.

More precisely, according to the present disclosure, information representing the image comprising the highest number of pixels in focus in the considered focal stack is first encoded.

Such information corresponds for example to the intra-encoding of such image comprising the highest number of pixels in focus. In this case, the reconstructed image is obtained by decoding said information corresponding to the intra-encoding.

Such information can also be signalling information permitting the receiver (i.e. the decoder) to reconstruct such image comprising the highest number of pixels in focus. In this case, the reconstructed image corresponds to the one that would be reconstructed by the decoder.

Then, for at least a pixel of the other image, the prediction consists in obtaining a value from at least a value of a corresponding pixel collocated in the reconstructed image.

For example, within the focal stack the other image will be encoded by using the value of luminance difference between the true luminance value of a pixel of the other image and the luminance value of a corresponding pixel collocated in the reconstructed image.

In other words, the structure of a focal stack is used to determine prediction dependencies between images belonging to the focal stack by using the image comprising the highest number of pixels in focus as a reference image for prediction. Thus, according to the present disclosure, a focal stack obtained from light-field data associated with the scene is used as a new group of picture (GOP) for image encoding.

It has to be noted that in the following, the word "reconstructed" and "decoded" can be used interchangeably. Usually, "reconstructed" is used on the encoder side while "decoded" is used on the decoder side.

According to a particular aspect, in the current focal stack, the image comprising the highest number of pixels in focus is an all-in focus image.

An all-in focus image (AIF image) corresponds to a reconstructed image where all the pixels are in focus.

It has to be noted that the all-in focus image can be received from an external provider, or that the all-in focus image is obtained during a previous step of the method according to the present disclosure.

According to a particular embodiment of the present disclosure, encoding at least one other image of the current focal stack by prediction from at least the reconstructed image comprises encoding, for at least a pixel of the other image, a value from at least a value of a corresponding pixel collocated in the reconstructed image and from a blurring function depending on a position in the focal stack associated with the other image to encode.

Taking such model of the blur permits to improve the encoding efficiency. As described in the following a typical example of blurring function is the Gaussian function given by:

$$h(x, y) = \frac{1}{2\pi\sigma^2} e^{-\frac{x^2+y^2}{2\sigma^2}}$$

where σ is the standard deviation of the Gaussian distribution that depends on the pixel distance (depth) to the focal plan. Ideally, σ should be computed per pixel and per image in the focal stack.

The original (all in focus image) grayscale pixels having a standard deviation $\sigma_x$ and the current pixel (current image plan) having a reduced standard deviation $\sigma_y$, then σ can be approximated as:

$$\sigma \approx \frac{\sigma_x}{2\sqrt{\pi}\,\sigma_y}$$

In order to apply the same process at the decoder, then σ has to be transmitted. To reduce the bit-rate this information may be transmitted per coding unit or block (in the header of the unit or as meta-data or SEI message (SEI meaning Supplemental Enhancement Information).

According to a particular embodiment of the disclosure, the current focal stack is part of a group of focal stacks captured with different viewing angles, the focal stacks of the group of focal stacks being ordered according to an orientation order of their viewing angles, and the method further comprises:

determining an inter-stack image encoding order from the orientation order and from a viewing angle, of the current focal stack, called reference viewing angle, encoding at least one pixel of an image of at least another focal stack of the group of focal stacks processed according to the inter-stack image encoding order from the reconstructed image of the current focal stack, the image of the at least another focal stack being the image with the highest number of pixels in focus and being, called a reference image.

In other words, considering the particular structure of a group of focal stacks captured with different viewing angles, the focal stacks of the group of focal stacks being ordered according to an orientation order of their viewing angles, for each focal stack belonging to the group of focal stacks, the reference image, corresponding to the image with the highest number of pixels in focus, is encoded from the reconstructed image of the current focal stack captured with a reference viewing angle.

As a consequence, starting from a single image of the current focal stack captured with a reference viewing angle (represented, for example, by information corresponding to its intra-encoding or by signalling information permitting the decoder to reconstruct it), it is possible to encode each reference image of each other focal stack belonging to the group of focal stacks, and then as previously described for the current focal stack, a reference image of a given focal stack captured with a viewing angle different from the reference viewing angle is used for encoding all the other images of the given focal stack.

Considering the particular case, wherein each reference image of a given focal stack captured with a viewing angle different from the reference viewing angle is an all-in focus image, the embodiment corresponds to predict each all-in focus image from its adjacent all-in focus images according to an inter-stack image encoding order previously determined.

For example, when considering the case wherein a bi-prediction is implemented, inter-stack image encoding order consists in considering that:

the reconstructed image corresponding to the image comprising the highest number of pixels in focus of the current focal stack is a "I frame" (i.e. an image that is encoded independently of all the other images of the group of focal stacks), the two reference images of two other focal stacks presenting a maximum viewing angle difference with the reference viewing angle associated with the reconstructed image of the current focal stack can be considered as "P frames", and then the other reference images, captured with an intermediate viewing angle between the "I reconstructed image" of the current focal stack and the "P reference images", are considered as "B frames".

According to a first variant of the embodiment, the pixel of the reference image is encoded from the reconstructed image of the current focal stack, captured with the reference value of viewing angle, and from information representing a disparity between the reference image and the reconstructed image of the current focal stack.

Indeed assuming that the disparity between views, two views corresponding to two differing images, representing a same scene, but captured with different viewing points is known and available (either computed or provided with the images of the group of focal stacks to encode), using the disparity can be performed as an alternative consisting in searching for one pixel of an image of at least another focal stack of the group of focal stacks the best match in the reconstructed image of the current focal stack captured with the reference viewing angle.

According to a second variant of the embodiment, the value of each pixel of the reference image, captured with a viewing angle different from the reference value of viewing angle, is encoded from the reconstructed image of the current focal stack captured with the reference value of viewing angle and from a layered depth image of a scene associated to the group of focal stacks.

In other words, according to this second variant, a layered depth image encoding scheme is used instead of searching for one pixel of an image of at least another focal stack of the group of focal stacks the best match in the reconstructed image of the current focal stack captured with the reference viewing angle.

More precisely, the layered depth image (LDI) encoding scheme as been proposed by Shade et al. in "*Layered Depth Images*" in proceedings of SIGGRAPH 1998, to merge multiple reference images under a single centre of projection. Such encoding scheme tackles the occlusion problems by keeping multiple depth pixels per pixel location, while still maintaining the simplicity of warping a single reference image. The LDI scheme consists thus in encoding an image, the depth/disparity and the occluding areas to reconstruct areas occlude in one view, which can not be reconstructed by using only the disparity.

According to another embodiment, the group of focal stacks is captured at a reference instant $t_0$, and is a part of a sequence further comprising at least one other group of focal stacks captured at an instant t, the method further comprises, encoding at least one pixel of a reference image of a focal stack, captured with the reference value of viewing angle, of the at least one other group of focal stacks, captured at an instant t, of the sequence of group of focal stacks, by using a temporal prediction performed from the reconstructed image of the current focal stack captured at the reference instant $t_0$.

In other words, according to this embodiment of the present disclosure, starting from a single image, corresponding to the image comprising the highest number of pixels in focus of the current focal stack captured with a reference viewing angle at a reference instant $t_0$, it is possible to encode a whole sequence comprising a plurality of groups of focal stacks captured at difference instant.

Such an encoding of the whole sequence, implements three levels of encoding to take into account the three parameters of a sequence of groups of focal stacks corresponding to the focalization distance, the viewing angle, and the capture instant:

an "intra-stack encoding" permitting to encode the focalization distance dimension of a focal stack captured at a given capture instant and with a given viewing angle, each image, belonging to the focal stack, being captured with a different focalization distance, and, an "inter-stack encoding" permitting to encode the viewing angle dimension of a group of focal stacks captured at a given instant, each focal stack, belonging to the group of focal stacks, being captured with a different viewing angle, and an "inter encoding" permitting to encode the temporal dimension of a sequence of groups of focal stacks, each group of focal stacks, belonging to the sequence, being captured at a different instant.

It has to be noted that any combination of these three levels of encoding can be implemented according to the present disclosure to succeed in encoding a whole sequence.

For example, starting from the image comprising the highest number of pixels in focus of the current focal stack captured with a reference viewing angle at a reference instant to, it is first possible to apply the "inter encoding", then the "intra-stack encoding" and finally an "inter-stack encoding", according to another example, beginning with the "inter-stack encoding", then the "inter-encoding" and finally the "intra-stack encoding" is also possible.

According to another particular aspect of the disclosure, the method further comprises inserting, a map to reconstruct the all in focus image of the current focal stack, in a signal representing the current focal stack.

More precisely, such a map indicates for each pixel, which image in the current focal stack should be used (e.g. where the considered pixel is in focus).

Another aspect of the present disclosure pertains to a signal representing at least a current focal stack comprising a set of images focused at a different focalization distance from one image to another, the signal comprising at least:

information representing an image of the current focal stack, the image, comprising the highest number of pixels in focus;

information, associated at least with another image of the current focal stack, and obtained by prediction from at least a reconstructed image of the image comprising the highest number of pixels in focus.

Another aspect of the present disclosure concerns a recording medium bearing a signal as described above.

Another aspect of the present disclosure pertains to a method for decoding at least a current focal stack comprising a set of images focused at a different focalization distance from one image to another. Such method comprises:

decoding information representing an image of the current focal stack, the image comprising the highest number of pixels in focus, reconstructing at least another image of the current focal stack by prediction from at least the decoded image.

Such a method for decoding is especially suited to decode a signal encoded according to the above-described encoding method.

In this way, the same prediction steps are performed as those performed when encoding so as to rebuild a given pixel, and by optionally adding the prediction residue (transmitted in the signal) to the prediction.

The characteristics and advantages of this decoding method are the same as those of the encoding method. Consequently, they shall not be described in greater detail.

Another aspect of the present disclosure pertains to a device for encoding a current focal stack comprising a set of images focused at a different focalization distance from one image to another, wherein the device comprises:

means for encoding information representing an image of the current focal stack, the image comprising the highest number of pixels in focus, and reconstructing the image into a reconstructed image;

means for encoding at least another image of the current focal stack by prediction from at least the reconstructed image.

In another embodiment of the disclosure, a device for encoding comprises a memory; and at least one processor coupled to the memory, the at least one processor being configured to perform the steps previously mentioned related to an encoding process.

Such an encoding device is adapted especially for implementing the method for encoding as described here above.

Another aspect of the present disclosure pertains to a device for decoding at least a current focal stack comprising a set of images focused at a different focalization distance from one image to another, wherein the device comprises:

means for decoding information representing an image of the current focal stack, the image comprising the highest number of pixels in focus, means for reconstructing at least another image of the current focal stack by prediction from at least the decoded image.

In another embodiment of the disclosure, a device for decoding comprises a memory; and at least one processor coupled to the memory, the at least one processor being configured to perform the steps previously mentioned related to a decoding process.

Such a decoding device is adapted especially for implementing the method for decoding as described here above.

The disclosure relates thus to devices comprising a processor configured to implement the above methods.

The present disclosure also concerns a computer program product downloadable from a communication network and/or recorded on a medium readable by a computer and/or executable by a processor, comprising program code instructions for implementing a method for encoding and/or decoding a focal stack as described above.

The present disclosure also concerns a non-transitory computer-readable medium comprising a computer program product recorded thereon and capable of being run by a processor, including program code instructions for implementing a method for encoding and/or decoding a focal stack as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the invention, as claimed.

It must also be understood that references in the specification to "one embodiment" or "an embodiment", indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specific nature of the disclosure as well as other objects, advantages, features and uses of the disclosure will become evident from the following description of embodiments taken in conjunction with the accompanying drawings.

4. BRIEF DESCRIPTION OF THE DRAWINGS

Embodiments of the invention can be better understood with reference to the following description and drawings, given by way of example and not limiting the scope of protection, and in which:

FIG. 1 already presented in relation with prior art, shows the conceptual schematic of a plenoptic camera;

FIG. 2 already presented in relation with prior art, is a diagram illustrating an example of a focal stack of images;

FIG. 3 shows schematically a diagram of the main steps of the method for encoding according to the present disclosure;

FIG. 4 schematically illustrates an example of encoding order implemented for "intra-stack encoding" a current focal stack;

Figure 7:
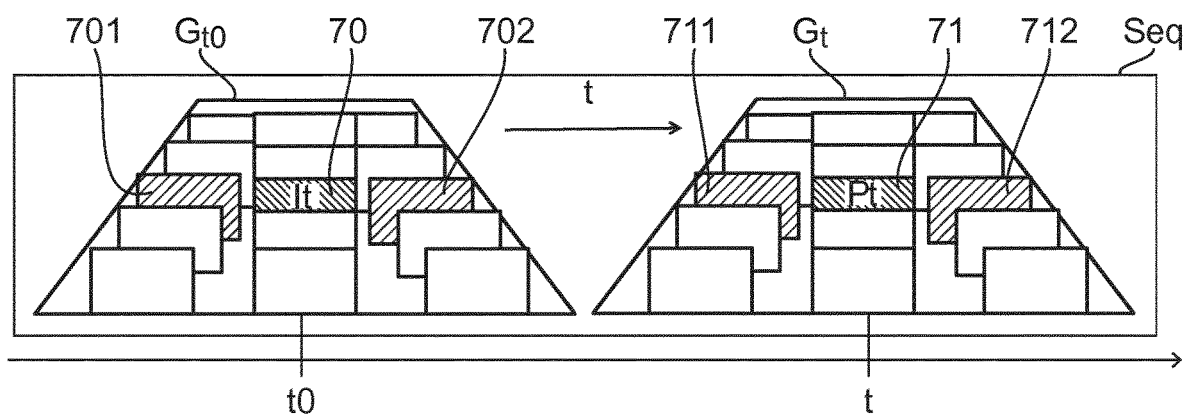
Figure 9:
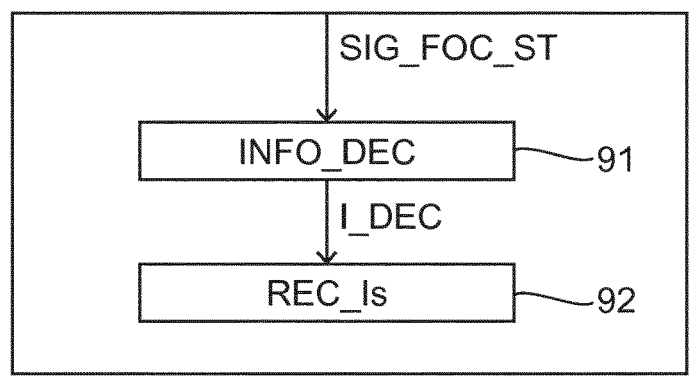
Figure 10:
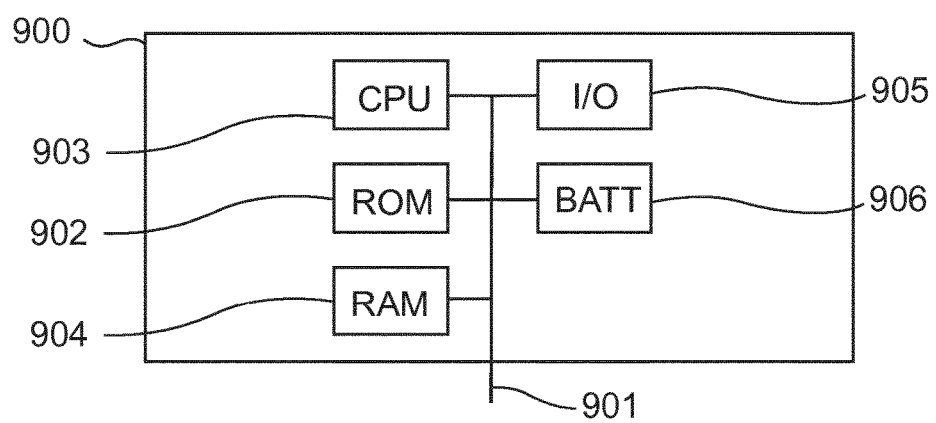
Figure 8:
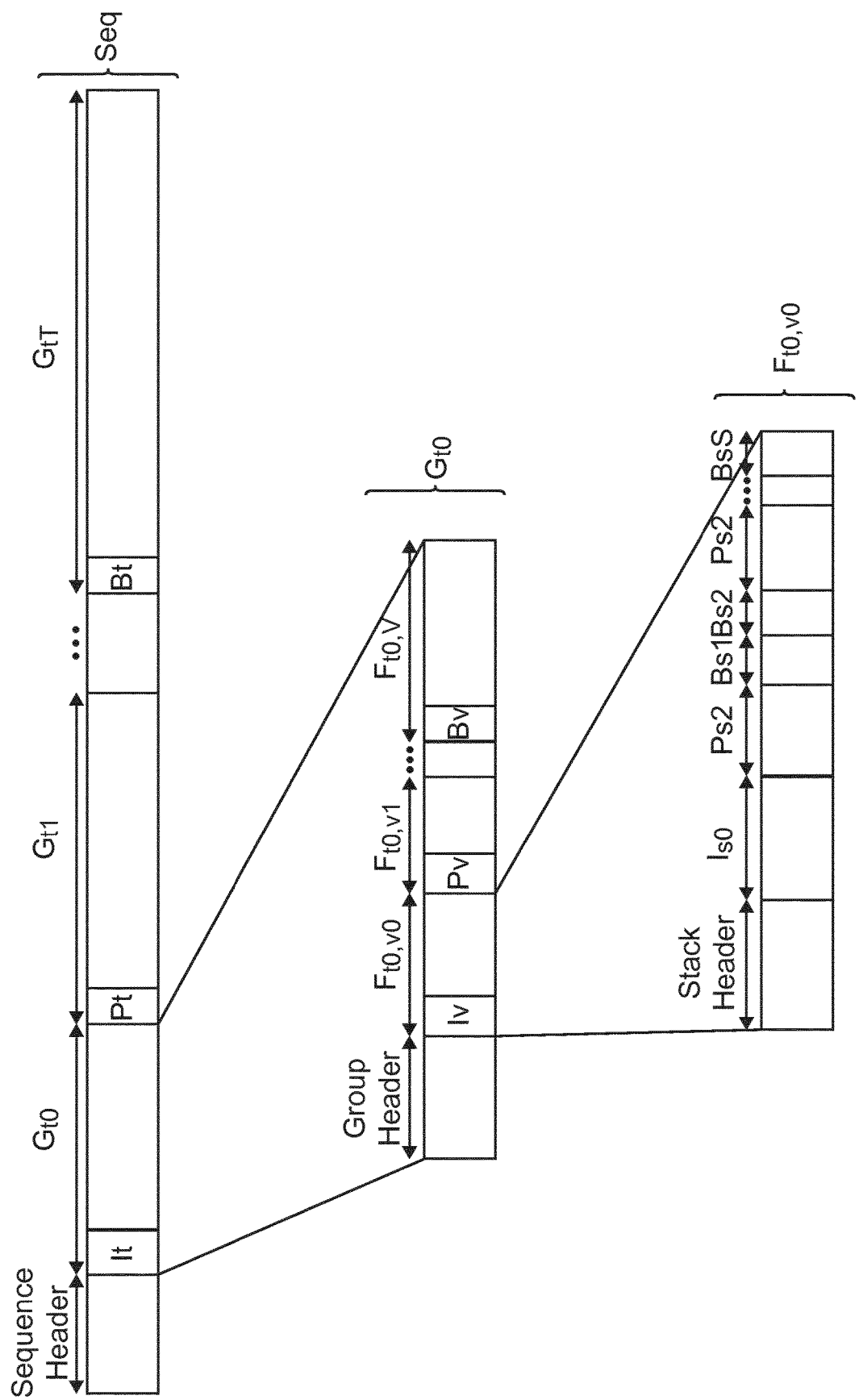

FIG. 7 schematically illustrates an example of "inter encoding" of a temporal sequence of groups of focal stacks;

FIG. 8 schematically illustrates the structure of a signal comprising a sequence of groups of focal stacks encoded according to the present disclosure;

FIG. 9 shows schematically a diagram of the steps of the method for decoding according to the present disclosure;

FIG. 10 shows an example of architecture of a device in accordance with an embodiment of the disclosure.

Similar or same elements are referenced with the same reference numbers. The components in the figures are not necessarily to scale, emphasis instead being placed upon illustrating the principles of the invention.

5. DETAILED DESCRIPTION

5.1 General Principle

The general principle of the present disclosure consists in a new way of encoding a focal stack in a light field context, by determining prediction dependencies within the new group of pictures (GOP) structure corresponding to a focal stack.

A description will now be given of encoding and decoding methods, corresponding devices and a computer-readable storage medium for encoding/decoding a focal stack of images in embodiments of the present disclosure.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or"

includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding pixels of a view of a focal stack but extends to the encoding/decoding of a sequence of groups of focal stacks (plenoptic video) because each view belonging to the sequence is sequentially encoded/decoded as described below.

5.2 Focal Stack

Figure 1:
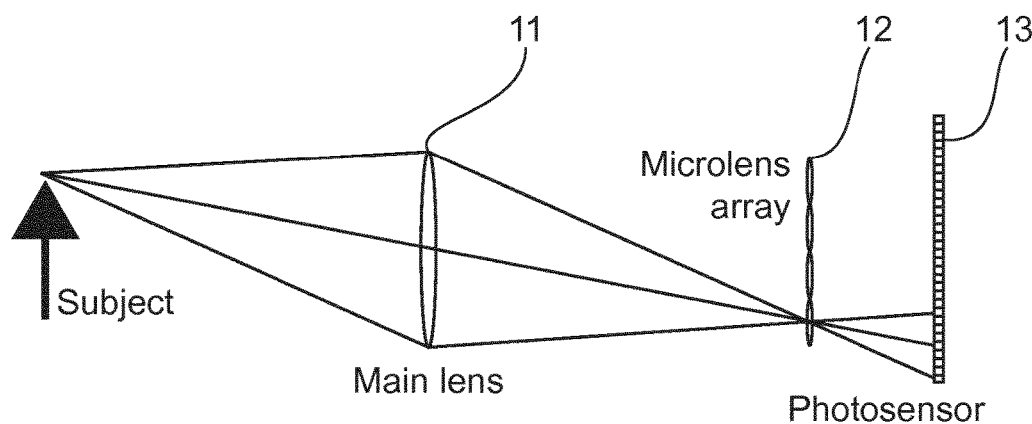
Figure 2:
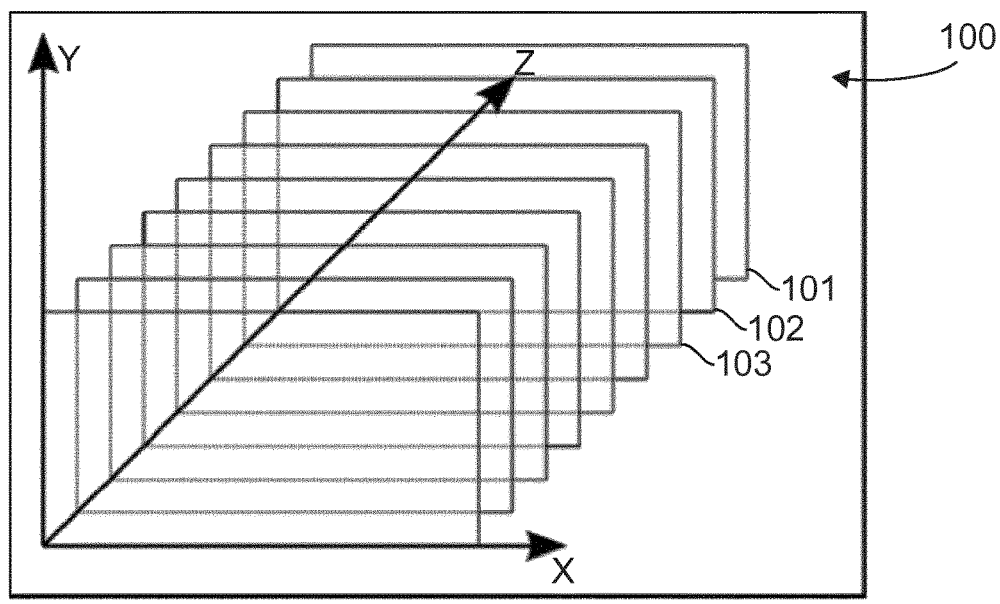

As illustrated in FIG. 2, focal stack 100 is a collection of S images $I_s$ (with $s \in [1,S]$) focused at different focal planes (i.e. at different focalization distances), which define a cube of images (101, 102, 103 . . . ), where S is a user selected number of images or a limitation required by a device (e.g. encoder/decoder). Hence, the distance or distance interval (on the z axis) between two consecutive images in the focal stack 100 corresponds to the distance between two focal planes linked to these two consecutive images.

The computation of the focal stack described can be based on the assumption that a 4D light field is recorded by a single image sensor with a lens array and optionally a main lens. However, the computation of a focal stack is not limited to the 4D light field recorded by such type of light-field camera, therefore it should be noted that it is possible to compute a focal stack of re-focused images based on the 4D light field recorded by any types of light field cameras.

5.3 The Encoding Method

Figure 3:
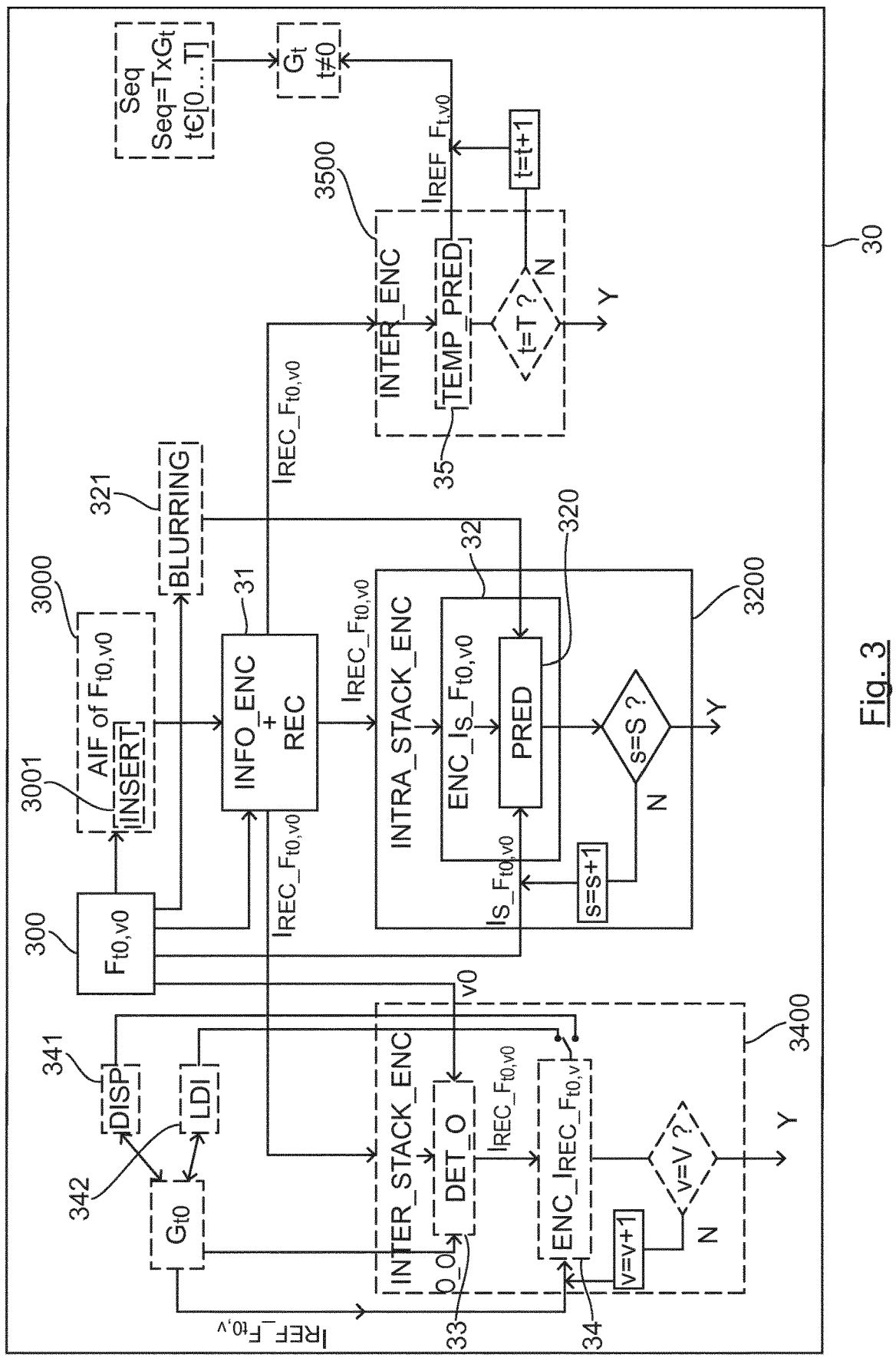

FIG. 3 shows schematically a diagram of the main steps of the method (30) for encoding at least one current focal stack $F_{t_0,v_0}$ according to the present disclosure. This method may be performed by an encoding device. The at least one current focal stack $F_{t_0,v_0}$ comprises a set of S images $$I_{S\_F_{t_0,v_0}}$$

focused at different focalization distances from one image to another, as represented on FIG. 3.

According to a specific and non-limiting embodiment, the method (30) for encoding the at least one current focal stack $F_{t_0,v_0}$ comprises first, encoding (31) as an intra-image, an image of the current focal stack $F_{t_0,v_0}$ which comprises the highest number of pixels in focus and second, reconstructing (31) the image into a reconstructed image $$I_{REC\_F_{t_0,v_0}}.$$

In this particular case, information representing the image comprising the highest number of pixels in focus in the considered focal stack corresponds to the intra-encoding of such image comprising the highest number of pixels in focus.

Optionally, as represented in dotted lines the image comprising the highest number of pixels in focus of the focal stack $F_{t_0,v_0}$ is an all-in focus image (AIF).

The AIF image may be received from an external provider, or may be computed (step 3000).

In addition, when the image comprising the highest number of pixels in focus of the current focal stack $F_{t_0,v_0}$ is an all-in focus image (AIF), it is possible to transmit the AIF image encoded as an intra-image to the receiver that will decode the transmitted encoded current focal stack $F_{t_0,v_0}$.

In another variant, a map may be inserted (3001) in a signal representing the encoded current focal stack $F_{t_0,v_0}$, the map making it possible to reconstruct the AIF image. Such insertion (3001) avoids the transmission of the AIF image encoded as an intra-image. Indeed, when receiving such a map the receiver reconstructs the AIF before decoding the other images of the focal stack.

As a consequence, in this particular case the information representing the AIF (i.e. the image comprising the highest number of pixels in focus of the current focal stack) can directly correspond to said map or can be another signalling information helping the receiver to understand that the map has to be used for the decoding, like an information bit, which has to be encoded (31).

Such a map indicates for each pixel, which image in the current focal stack should be used (e.g. where the considered pixel is in focus).

Once, the reconstructed image $$I_{REC\_F_{t_0,v_0}}$$

is obtained (31), at least another image $$I_{S\_F_{t_0,v_0}}$$

of the current focal stack $F_{t_0,v_0}$ is encoded (32) by prediction (320) from at least the reconstructed image $$I_{REC\_F_{t_0,v_0}}.$$

In other words, for at least a pixel of the other image $$I_{S\_F_{t_0,v_0}},$$

the prediction (320) comprises obtaining a value from at least a value of a corresponding pixel collocated in the reconstructed image $$I_{REC\_F_{t_0,v_0}}.$$

For example, within the current focal stack $F_{t_0,v_0}$, the other image $$I_{S\_F_{t_0,v_0}}$$

will be encoded by using the value of luminance difference (also known as residue or residual signal) between the true luminance value of a pixel of the other image $$I_{S\_F_{t_0,v_0}}$$

and the luminance value of a corresponding pixel collocated in the reconstructed image $$I_{REC\_F_{t_0,v_0}}.$$

Such an encoding (32) of all the S images of the current focal stack $F_{t_0,v_0}$, except the reconstructed image $$I_{REC\_F_{t_0,v_0}}$$

associated with the image comprising the highest number of pixels in focus, can be called an "intra-stack encoding" and consists thus in taking advantage of the dependencies between all the S images of the current focal stack $F_{t_0,v_0}$, since all of the images are predicted at least from the reconstructed image $$I_{REC\_F_{t_0,v_0}},$$

which is for example, previously encoded as an intra image.

Optionally, to improve encoding efficiency a model of the blur (321) can be added depending on the position of each image in the current focal stack $F_{t_0,v_0}$.

The blurring process (321) can be defined by:

g(x,y)=h(x,y)*f(x,y)+n(x,y), for each pixel (whose coordinates are (x,y)) of the considered image $$I_{S\_F_{t_0,v_0}}$$

of size [m×n] (i.e. m pixels by n pixels), wherein:
f(x,y) corresponds to a value of the collocated pixel of coordinates (x,y) of the reconstructed image $$I_{REC\_F_{t_0,v_0}}$$

of the current focal stack $F_{t_0,v_0}$,
h(x,y) corresponds to the blurring function representing the blur between the another image of the current focal stack $F_{t_0,v_0}$ and the reconstructed image $$I_{REC\_F_{t_0,v_0}},$$

n(x,y) an additive noise,
g(x,y) corresponds to the blurred pixel of the considered image to encode $$I_{S\_F_{t_0,v_0}}$$

of the current focal stack $F_{t_0,v_0}$, the blurring value being obtained from the reconstructed image $$I_{REC\_F_{t_0,v_0}}$$

used as a source image.

It has to be noted that when ignoring the noise n(x,y), the convolution by the blurring function is given by:

$$g(x,y) = h(x,y) * f(x,y) = \Sigma_{i=-a}^{a}\Sigma_{j=-b}^{b}h(i,j)f(x+i, y+j),$$

$$\text{where: } a = \frac{m-1}{2}, b = (n-1)/2.$$

A typical example of blurring function is the Gaussian function given by:

$$h(x,y) = \frac{1}{2\pi\sigma^2}e^{-\frac{x^2+y^2}{2\sigma^2}}$$

where σ is the standard deviation of the Gaussian distribution that depends on the pixel distance (depth) to the focal plan. Ideally, σ should be computed per pixel and per image in the focal stack. For instance, it can be estimated by:
if the original (all in focus image) grayscale pixel values have a standard deviation $\sigma_x$ and if the current pixel (current image plan) the reduced standard deviation is $\sigma_y$, then σ can be approximated as:

$$\sigma \approx \frac{\sigma_x}{2\sqrt{\pi}\,\sigma_y}$$

In order to apply the same process at the decoder, then σ has to be transmitted. To reduce the bit-rate this information may be transmitted per coding unit or block (in the header of the unit or as meta-data or SEI message (SEI meaning Supplemental Enhancement Information).

Another blurring model could be used such as the one disclosed by T. J Kosloff et al. in "*An Algorithm for Rendering Generalized Depth of Field Effects Based on Simulated Heat Diffusion*", International Conference on Computational Science and Its Applications, 2007.

Once the value g(x,y) is obtained, it is then compared to the true value of the pixel, whose coordinates are (x,y) in the another image to encode $$I_{S\_F_{t_0,v_0}}.$$

The difference (also called residue) between these two values is then used to encode the pixel of the another image to encode $$I_{S\_F_{t_0,v_0}}.$$

Reciprocally, at the decoding, starting from the value of the collocated pixel in the reconstructed image $$I_{REC\_F_{t_0,v_0}}$$

obtained by decoding the information representing the image comprising the highest number of pixels in focus of the current focal stack, a pixel, whose coordinates are (x,y) of another image to decode of the focal stack $F_{t_0,v_0}$ is obtained by adding the residue to the blurring result of a pixel collocated in the reconstructed image $$I_{REC\_F_{t_0,v_0}}.$$

Figure 4:
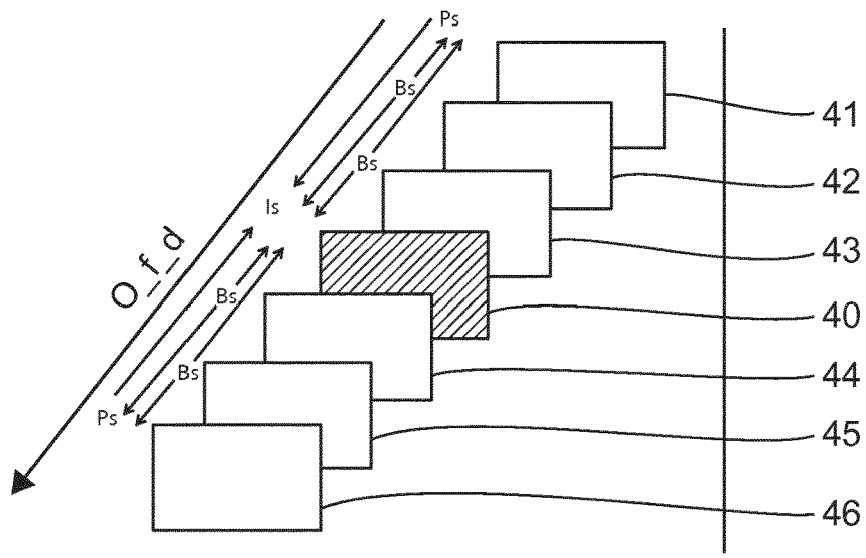

FIG. 4 schematically illustrates an example of "intra-stack encoding" of a current focal stack $F_{t_0,v_0}$, captured at an instant $t_0$ and with a viewing $v_0$. The images $$I_{S\_F_{t_0,v_0}}$$

of the current focal stack $F_{t_0,v_0}$ are ordered for example according to an increasing order O_f_d depending on the distance between the focal plane of the first image $$I_{S\_F_{t_0,v_0}}$$

(41) and the focal plane of each following image (42, 43, 44, 45, 46). According to such example, and considering that the prediction (320) is a bi-prediction the reconstructed image $$I_{REC\_F_{t_0,v_0}}$$

(40) is considered as an "I frame" and corresponds for instance to the image located in the middle of the focal stack $F_{t_0,v_0}$.

Using the reconstructed image $$I_{REC\_F_{t_0,v_0}}$$

(40) as an "I frame", the two extreme images of the focal stack $F_{t_0,v_0}$ (i.e. the first image (41) and the last image (46)) are predictively encoded as "P frames". They are reconstructed and possibly used later for predictively encoding the intermediates images as "B frames". The "B frames" are located between the "I frame" (40) corresponding to the reconstructed image $$I_{REC\_F_{t_0,v_0}}$$

and one of the "P frames" (41 and 46). More precisely, the "B frames" are predicted using both $$I_{REC\_F_{t_0,v_0}}$$

and reconstructed "P frames" used as reference images.

Thus, it can be noted that the encoding order, that is implemented according to this example during the "intra-stack" encoding as proposed according to the present disclosure, is different from the stack order O_f_d, since the "I frame" (40) having the highest number of pixels in focus (e.g. located in the middle of the focal stack) is, for example, first encoded as an intra-image, and then the "P frames" (41 and 46) corresponding to the first and the last image of the focal stacks, and finally the "B frames" (42, 43, 44 and 45) corresponding to the intermediates images located between the "I frame" (40) and one of the "P frames" (41 and 46).

Depending on the application, it is possible that the current focal stack $F_{t_0,v_0}$ is part of a group $G_{t_0}$ of focal stacks which are captured at the same time to as the current focal stack $F_{t_0,v_0}$ but with different viewing angles from the viewing angle $v_0$ of the current focal stack $F_{t_0,v_0}$.

Figure 5:
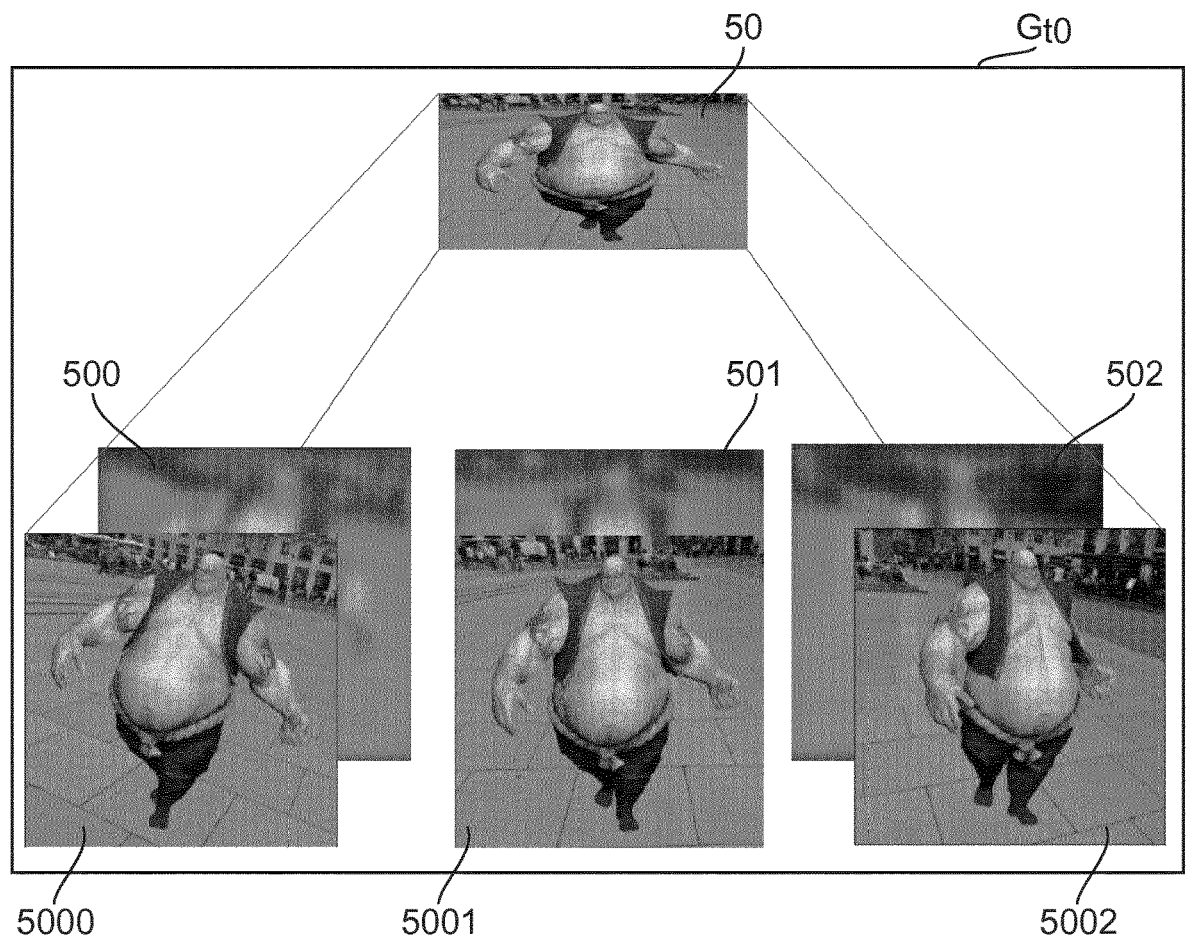
FIG. 5 is a diagram illustrating an example of a group focal stacks.

For example, FIG. 5 illustrates an example of a group $G_{t_0}$ of focal stacks captured from a same scene (50) wherein two focus planes (i.e. S=2) corresponding respectively to:
- a first focus plane where the images 500, 501 and 502 have been captured, and
- a second focus plane where the images 5000, 5001 and 5002 have been captured, and three different viewing angles (i.e. V=3) corresponding respectively to:
- a first viewing angle for capturing the two images 500 and 5000 wherein the main character is lightly turned towards left,
- a second viewing angle for capturing the two images 501 and 5001 wherein the main character is captured front view,
- a third viewing angle for capturing the two images 502 and 5002 wherein the main character is lightly turned towards right.

In this optional case (as represented in dotted lines on the left in FIG. 3) an "inter-stack encoding" 3400 is performed to encode all the images belonging to the group $G_{t_0}$ of focal stacks.

Figure 6:
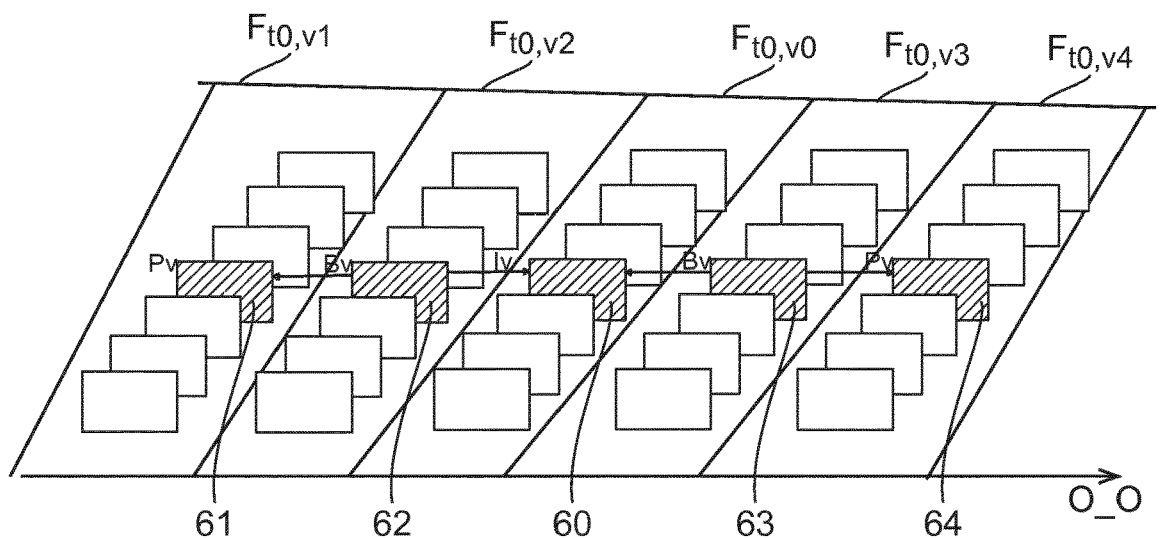
FIG. 6 illustrates an example of "inter-stack encoding" a group of focal stacks.

More precisely, the focal stacks of the group of focal stacks are ordered according to an orientation order of their viewing angles as illustrated for example in FIG. 5 or 6.

In this particular case, the "inter-stack encoding" comprises:
- determining (33) an inter-stack image encoding order from the orientation order and from the viewing angle $v_0$, of the current focal stack, called reference viewing angle $v_0$,
- encoding (34) at least one pixel of an image of at least another focal stack $F_{t_0,v}$ of the group of focal stacks $G_{t_0}$ processed according to the inter-stack image encoding order from the reconstructed image $$I_{REC\_F_{t_0,v_0}}$$

of the current focal stack $F_{t_0, v_0}$, the image of the at least another focal stack $F_{t_0,v}$ being the image with the highest number of pixels in focus and being, called a reference image.

Regarding FIG. 5 the orientation order consists in ordering the images as following the position of the capture device from left to right vis-à-vis the main character. Considering that the encoding (34) implemented in the "inter-stack encoding" prediction (320) is a bi-prediction the reconstructed image $$I_{REC\_F_{t_0,v_0}}$$

is considered as an "I frame" and corresponds for instance to the image 5001 wherein the main character is face captured with a viewing angle $v_0$.

FIG. 6 illustrates another example of a group $G_{t_0}$ of focal stacks captured from a same scene, wherein six focus planes other than the focal plane of the reconstructed image $$I_{REC\_F_{t_0,v_0}}$$

(60) (i.e. S=6) and four different viewing angles (i.e. V=4) other than the viewing angle $v_0$, of the current focal stack $F_{t_0,v_0}$ are used.

The viewing angles $v_1$, $v_2$, $v_0$, $v_3$ and $v_4$ are ordered according to the orientation order O_O.

The "inter-stack encoding" (3400) comprises encoding all the reference images (61, 62, 63 and 64) at least from the reconstructed image $$I_{REC\_F_{t_0,v_0}}$$

(60) considered as an "I frame".

The two extreme reference images when considering the orientation order of the group $G_{t_0}$ of focal stacks corresponding to the images (61) and (64) are predictively encoded from $$I_{REC\_F_{t_0,v_0}}$$

as "P frames" and reconstructed. The reconstructed "P frames" may be used later for predictively encoding the intermediates images as "B frames" (62 and 63), the "B frames" (62 and 63) being located between the "I frame" (60) corresponding to the reconstructed image $$I_{REC\_F_{t_0,v_0}}$$

(60) and one of the "P frames" (61 and 64).

Thus, it can be noted that the encoding order, that is implemented according to this example during the "inter-stack" encoding as proposed according to the present disclosure, is different from the orientation order O_O, since the "I frame" (60) located in the middle of the group of focal stacks is, for example, first encoded as an intra-image, and then the "P frames" (61 and 64), and finally the "B frames" (62 and 63) corresponding to the intermediates images located between the "I frame" (60) and one of the "P frames" (61 and 64).

According to a first variant, once one reference image (61, 62, 63 or 64) has been encoded for one focal stack (with $v \in [1; 4]$) of the group of focal stacks comprising the focal stacks $F_{t_0,v_1}$, $F_{t_0,v_2}$, $F_{t_0,v_0}$, $F_{t_0,v_3}$, $F_{t_0,v_4}$, within the considered focal stack, for example $F_{t_0,v_1}$, the other images of the six other focus planes are encoded using the "intra-stack encoding" 3200 as described above.

According to a second variant all the reference images (61, 62, 63 or 64) can be encoded from the reconstructed image $$I_{REC\_F_{t_0,v_0}}$$

(60) and then for each of the focal stacks $F_{t_0,v_1}$, $F_{t_0,v_2}$, $F_{t_0,v_0}$, $F_{t_0,v_3}$, $F_{t_0,v_4}$, an "intra-stack encoding" 3200 is performed.

According to a particular feature of the "inter-stack encoding", assuming that the disparity (341) between images of the group $G_{t_0}$ of focal stacks is known and available (either computed or available or transmitted with those images), such a disparity (341) is used to improve the prediction of one reference image (61, 62, 63 or 64) from the reconstructed image $$I_{REC\_F_{t_0,v_0}}$$

(60).

Taking into account such a disparity is an alternative regarding the classical searching for the best match that can be implemented during the prediction.

For example, for one pixel of coordinates (x,y) of the reference image corresponding to a "P-frame" (61), the value of the pixel $P_v(x,y)$ is such that:

Pv(x,y)=Iv(x+dx,y+dy) where dx and dy are the disparities respectively in the horizontal and in the vertical directions.

According to another particular feature of the "inter-stack encoding", a layered depth image (LDI) coding scheme could be used (342) as another alternative to encode those views. The LDI scheme consists in encoding an image, the depth/disparity and the occluding areas to reconstruct the areas occluded in one view (i.e. image), which cannot be reconstructed by the disparity.

Depending on the application, it is also possible that the group $G_{t_0}$ of focal stacks, captured at the same time to as the current focal stack $F_{t_0,v_0}$, belongs also to a sequence Seq further comprising at least one other group $G_t$ of focal stacks captured at an instant t different from $t_0$ as illustrated by FIG. 7.

In this case, the method according to the present disclosure comprises an "inter-encoding" (3500) of at least one pixel of a reference image (71) of a focal stack, captured with the reference value of viewing angle $v_0$, of the at least one other group $G_t$ of focal stacks, captured at an instant t, of the sequence Seq of group of focal stacks, by using a temporal prediction (35) performed from the reconstructed image $$I_{REC\_F_{t_0,v_0}}$$

(70) of the current focal stack $F_{t_0,v_0}$ of the group $G_{t_0}$ of focal stacks captured at the reference instant $t_0$.

It can be seen that the sequence of group of focal stacks as represented on FIG. 7 comprises only two groups of focal stacks $G_{t_0}$ and $G_t$ respectively (i.e. T=2, where T is the number of groups of focal stacks of one sequence Seq). Thus, the group $G_t$ of focal stacks may be considered as a "P-group" regarding the group $G_{t_0}$ captured at the reference instant $t_0$ itself considered as an "I-group". Indeed, the "P-group" $G_t$ is encoded from the "I-group" $G_{t_0}$. Said otherwise, the "I-group" $G_{t_0}$ comprises the image, for example, encoded as an intra-image, which is then used either directly or indirectly, after being reconstructed $$I_{REC_{F_{t_0,v_0}}}$$

(70), for encoding all the other images of the sequence. If more than two groups exist (T>2), then the same concept is valid for "B-group" encoded from the "I-group" (or "P-group") and another other "P-Group".

It can be noticed, that when such a sequence has to be encoded, it is possible to first encode (3500) the reference image (71), captured with the reference viewing angle $v_0$ of the other group $G_t$ of focal stacks from the reconstructed image $$I_{REC_{F_{t_0,v_0}}}$$

(70), and then within each group $G_{t_0}$ and $G_t$ to encode all the other remaining images using the "intra-stack encoding" (3200) and "the inter-stack encoding" (3400) as described above.

However, it is also possible to first encode all images of the group $G_{t_0}$ using the "intra-stack encoding" (3200) and "the inter-stack encoding" (3400) as described above and then to encode the reference image 71 of the group $G_t$ using the "inter-encoding" (3500) and then all the other images of the group $G_t$ using the "intra-stack encoding" (3200) and "the inter-stack encoding" (3400) as described above.

To improve the "inter-encoding" (3500) motion compensation models may be used to improve the prediction accuracy.

A structure of a signal (e.g. a bitstream) comprising such an encoded sequence, comprising T groups of focal stacks, is illustrated by FIG. 8.

The number of groups, T+1, corresponds to the T instants of capture plus the reference instant $t_0$. Within one group $G_{t_0}$ of focal stacks, V+1 different viewing angles are used to capture V different focal stacks and the focal stack $F_{t_0,v_0}$ captured at the instant $t_0$ with the reference viewing angle $v_0$. The focal stack $F_{t_0,v_0}$ comprises S+1 images, the image $Is_0$, for example, encoded as intra image, and the S other images focused at a different focalization distance from one image to another.

Such signal as represented on FIG. 8 is thus organised hierarchically, each hierarchical level: Sequence level, Group level and Stack level comprises a header in which the encoding parameters are specified.

For example, the Sequence header comprises the number S of images per focal stack, the number V of viewing angles per group of focal stacks, and the number T of capture instants per sequence but also the image's format, the frame rate, etc.

It can be also seen that when a bi-prediction is implemented the encoding order (I, P, B) is also specified in this signal.

5.4 The Decoding Method

Referring now to FIG. 9, the main steps of decoding implemented in a decoder suitable for decoding a signal representing at least a current focal stack, comprising a set of images focused at a different focalization distance from one image to another, are presented.

It is assumed that the decoder receives signal representing at least a current focal stack encoded for example according to the encoding method described here above.

Thus, in this embodiment, the method of decoding according to the invention comprises:
  decoding (91) information representing an image of the current focal stack, the image comprising the highest number of pixels in focus,
  reconstructing (92) at least another image of the current focal stack by prediction from at least the decoded image.

Reciprocally to the encoding as described above, the decoding method, according to the present disclosure, decodes each image of the current focal stack starting from the reconstructed image corresponding to the image comprising the highest number of pixels in focus.

Optionally, and reciprocally to the encoding said image comprising the highest number of pixels in focus of the focal stack is an all-in focus image (AIF).

In this particular case, the decoder extracts for example, from said signal representing at least a current focal stack encoded according to the encoding method described here above, a map permitting to reconstruct said AIF image.

Such a map indicates for each pixel, which image in the current focal stack should be used (e.g. where the considered pixel is in focus).

Once, the image comprising the highest number of pixels in focus is decoded (91) as an intra-image or reconstructed as an AIF by using a map inserted in the received signal, at least another image of the current focal stack is decoded (92) by prediction from at least said image comprising the highest number of pixels in focus.

In other words, for at least a pixel of the other image, the prediction comprises obtaining a value from at least a value of a corresponding pixel collocated in the image corresponding to the image comprising the highest number of pixels in focus of the current focal stack.

Such a decoding (92) of all the images of the current focal stack, except the decoded image associated with the image comprising the highest number of pixels in focus, can be called an "intra-stack decoding" and consists thus in taking advantage of the dependencies between all the images of the current focal stack, since all of the images are predicted at least from the reconstructed image.

Reciprocally to the "intra-stack encoding", said "intra-stack decoding" can also takes into account a model of blur.

In addition, depending on the application, it is possible that the current focal stack is part of a group of focal stacks which are captured at the same time as the current focal stack but with different viewing angles from the viewing angle of the current focal stack as represented on FIG. 5 as already described above.

In this optional case an "inter-stack decoding" (not represented) is performed to decode all the images belonging to the group of focal stacks.

More precisely, the focal stacks of the group of focal stacks are ordered according to an orientation order of their viewing angles as illustrated for example in FIG. 5.

In this particular case, the "inter-stack decoding" comprises:
- determining an inter-stack image decoding order from the orientation order and from the viewing angle $v_0$, of the current focal stack, called reference viewing angle $v_0$,
- decoding at least one pixel of an image of at least another focal stack of the group of focal stacks processed according to the inter-stack image decoding order from the reconstructed image of the current focal stack, the image of the at least another focal stack being the image with the highest number of pixels in focus and being, called a reference image.

According to a first variant, once one reference image has been decoded for one focal stack of the group of focal stacks comprising the focal stacks, within the considered focal stack, the other images of the other focus planes are decoded using the "intra-stack decoding" as described above.

According to a second variant all the reference images can be decoded from the reconstructed image and then for each of the focal stacks an "intra-stack decoding" is performed.

According to a particular feature of the "inter-stack decoding", assuming that the disparity between images of the group of focal stacks is known by the decoder and available (either computed or available or transmitted by the encoder within the signal to decode), such a disparity is used to improve the prediction of one reference image the reconstructed image.

Taking into account such a disparity is an alternative regarding the classical searching for the best match that can be implemented during the prediction.

According to another particular feature of the "inter-stack decoding", a layered depth image (LDI) decoding scheme could be used as another alternative to decode those views. The LDI scheme consists in decoding an image, the depth/disparity and the occluding areas to reconstruct the areas occluded in one view (i.e. image), which cannot be reconstructed by the disparity.

Depending on the application, it is also possible that the group of focal stacks, captured at the same time as the current focal stack, belongs also to a sequence Seq further comprising at least one other group of focal stacks captured at a different instant as illustrated by FIG. 7.

In this case, the method according to the present disclosure comprises an "inter-decoding" of at least one pixel of a reference image of a focal stack, captured with the reference value of viewing angle $v_0$, of the at least one other group of focal stacks, captured at an instant t, of the sequence Seq of group of focal stacks, by using a temporal prediction performed from the reconstructed image of the current focal stack of the group of focal stacks captured at the reference instant.

It can be noticed, that when such a sequence has to be decoded, it is possible to first decode the reference image, captured with the reference viewing angle $v_0$ of the other group of focal stacks from the reconstructed image, and then within each group $G_{r0}$ and $G_t$ to decode all the other remaining images using the "intra-stack decoding" and "the inter-stack decoding" as described above.

However, it is also possible to first decode all images of the group $G_{r0}$ using the "intra-stack decoding" and "the inter-stack decoding" as described above and then to decode the reference image of the group $G_t$ using the "inter-decoding" and then all the other images of the group $G_t$ using the "intra-stack decoding" and "the inter-stack decoding" as described above.

To improve the "inter-decoding" motion compensation models may be used to improve the prediction accuracy.

5.5 Structures of the Encoder and Decoder

On FIGS. 3, and 9, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 10 represents an exemplary architecture of a device 900 which may be configured to implement an encoding method described in relation with FIG. 3-7 or a decoding method in relation with FIG. 9.

Device 900 comprises following elements that are linked together by a data and address bus 901:
- a microprocessor 903 (or CPU), which is, for example, a DSP (or Digital Signal Processor);
- a ROM (or Read Only Memory) 902;
- a RAM (or Random Access Memory) 904;
- an I/O interface 905 for transmission and/or reception of data, from an application; and
- a battery 906.

According to a variant, the battery 906 is external to the device. Each of these elements of FIG. 10 are well-known by those skilled in the art and won't be disclosed further. In each of mentioned memory, the word «register» used in the specification can correspond to area of small capacity (some bits) or to very large area (e.g. a whole program or large amount of received or decoded data). ROM 902 comprises at least a program and parameters. Algorithm of the methods according to the disclosure is stored in the ROM 902. When switched on, the CPU 903 uploads the program in the RAM and executes the corresponding instructions.

RAM 904 comprises, in a register, the program executed by the CPU 903 and uploaded after switch on of the device 900, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the focal stack is obtained from a source. For example, the source belongs to a set comprising:
- a local memory (902 or 904), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (905), e.g. a wireline interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments of encoding or encoder, a signal delivered by the encoder is sent to a destination. As an example, the signal is stored in a local or remote memory, e.g. a video memory (904) or a RAM (904), a hard disk (902). In a variant, the signal is sent to a storage interface, e.g. an interface with a mass storage, a flash memory, ROM, an optical disc or a magnetic support and/or transmitted over a communication interface (905), e.g. an interface to a point to point link, a communication bus, a point to multipoint link or a broadcast network.

According to different embodiments of the decoding or decoder, the decoded focal stack is sent to a destination; specifically, the destination belongs to a set comprising:
- a local memory (902 or 904), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (905), e.g. a wireline interface (for example a bus interface, a wide area network interface, a local area network interface) or a wireless interface (such as a IEEE 802.11 interface or a Bluetooth® interface); and
- a display.

According to different embodiments of decoding or decoder, a signal is obtained from a source. Exemplarily, the signal is read from a local memory, e.g. a video memory (904), a RAM (904), a ROM (902), a flash memory (902) or a hard disk (902). In a variant, the signal is received from a storage interface, e.g. an interface with a mass storage, a RAM, a ROM, a flash memory, an optical disc or a magnetic support and/or received from a communication interface (905), e.g. an interface to a point to point link, a bus, a point to multipoint link or a broadcast network.

Implementations of the various processes and features described herein may be embodied in a variety of different equipment or applications. Examples of such equipment includes an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, resident software, micro-code, and so forth, or an embodiment combining software and hardware aspects that can all generally be referred to herein as a "circuit", "module", or "system".

When the present principles are implemented by one or several hardware components, it can be noted that a hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
  encoding a current focal stack including a set of images of a same scene focused at different focalization distances from one image to another, wherein said encoding comprises:
  encoding information representing an image of the current focal stack, said image being selected in said current focal stack according to an image sharpness criterion, and reconstructing said image into a reconstructed image; and
  encoding at least one other image of the current focal stack by prediction from at least said reconstructed image.

2. The method according to claim 1, wherein, said image sharpness criterion corresponds to a number of pixels in focus in an image.

3. The method according to claim 2, wherein, the selected image in the current focal stack is the one that has the highest number of pixels in focus.

4. The method according to claim 3, wherein the image comprising the highest number of pixels in focus is an all-in-focus image.

5. The method according to claim 4, wherein said method further comprises:
  combining at least said encoded information representing said image of the current focal stack selected according to said image sharpness criterion and said at least one other encoded image of the current focal stack into a signal representing said current focal stack; and
  inserting, a map to reconstruct said all in focus image of said current focal stack, in said signal representing said current focal stack.

6. The method according to claim 1, wherein encoding at least one other image of the current focal stack by prediction from at least said reconstructed image comprises encoding, for at least a pixel of said other image, a value from at least a value of a corresponding pixel collocated in said reconstructed image and from a blurring function depending on a depth position associated with said other image to encode.

7. The method according to claim 1, wherein said current focal stack is part of a group of focal stacks captured with different viewing angles, said focal stacks of said group of focal stacks being ordered according to an orientation order of their viewing angles, and wherein said method further comprises:
  determining an inter-stack image encoding order from said orientation order and from a viewing angle, of said current focal stack, called reference viewing angle,
  encoding at least one pixel of an image of at least another focal stack of said group of focal stacks processed according to said inter-stack image encoding order from the reconstructed image of said current focal stack, said image of said at least another focal stack, called a reference image, being the image selected according to an image sharpness criterion.

8. The method according to claim 7, wherein said pixel of said reference image is encoded from said reconstructed image of the current focal stack, captured with said reference viewing angle, and from information representing a disparity between said reference image and said reconstructed image of the current focal stack.

9. The method according to claim 7, wherein said value of each pixel of said reference image, captured with a viewing angle different from said reference value of viewing angle, is encoded from said reconstructed image of the current focal stack, captured with said reference value of viewing angle, and from a layered depth image of a scene associated to said group of focal stacks.

10. The method according to claim 7, wherein said group of focal stacks is captured at a reference instant $t_0$, and is a part of a sequence further comprising at least one other group of focal stacks captured at an instant t, said method further comprises, encoding at least one pixel of a reference image of a focal stack, captured with said reference value of viewing angle, of said at least one other group of focal stacks, captured at an instant t, of said sequence of group of focal stacks, by using a temporal prediction performed from the reconstructed image of said current focal stack captured at said reference instant $t_0$.

11. A method comprising:
decoding at least a current focal stack including a set of images of a same scene focused at different focalization distances from one image to another, wherein said decoding comprises:
 decoding information representing an image of the current focal stack, said image fulfilling an image sharpness criterion,
 reconstructing at least another image of the current focal stack by prediction from at least said decoded image.

12. The method according to claim 11, wherein:
said image sharpness criterion corresponds to a number of pixels in focus in an image;
the selected image in the current focal stack is the one that has the highest number of pixels in focus; and
the image comprising the highest number of pixels in focus is an all-in-focus image.

13. The method according to claim 11, wherein decoding at least one other image of the current focal stack by prediction from at least said reconstructed image comprises decoding, for at least a pixel of said other image, a value from at least a value of a corresponding pixel collocated in said reconstructed image and from a blurring function depending on a depth position associated with said other image to decode.

14. The method according to claim 11, wherein said current focal stack is part of a group of focal stacks captured with different viewing angles, said focal stacks of said group of focal stacks being ordered according to an orientation order of their viewing angles, and wherein said method further comprises:
 determining an inter-stack image decoding order from said orientation order and from a viewing angle, of said current focal stack, called reference viewing angle,
 decoding at least one pixel of an image of at least another focal stack of said group of focal stacks processed according to said inter-stack image decoding order from the reconstructed image of said current focal stack, said image of said at least another focal stack, called a reference image, being the image selected according to an image sharpness criterion; wherein
 said pixel of said reference image is decoded from said reconstructed image of the current focal stack, captured with said reference viewing angle, and from information representing a disparity between said reference image and said reconstructed image of the current focal stack.

15. A device comprising:
a memory; and
at least one processor coupled to the memory, the at least one processor being configured to:
encode a current focal stack comprising a set of images of a same scene focused at different focalization distances from one image to another, wherein said at least one processor being configured to encode the current focal stack comprises being further configured to:
 encode information representing an image of the current focal stack, said image being selected in said current focal stack according to an image sharpness criterion, and reconstruct said image into a reconstructed image;
 encode at least another image of the current focal stack by prediction from at least said reconstructed image.

16. The device according to claim 15, wherein:
said image sharpness criterion corresponds to a number of pixels in focus in an image;
the selected image in the current focal stack is the one that has the highest number of pixels in focus; and
the image comprising the highest number of pixels in focus is an all-in focus image.

17. The device according to claim 15, wherein the at least one processor being configure to encode at least one other image of the current focal stack by prediction from at least said reconstructed image comprises being further configured to encode, for at least a pixel of said other image, a value from at least a value of a corresponding pixel collocated in said reconstructed image and from a blurring function depending on a depth position associated with said other image to encode.

18. The device according to claim 15, wherein said current focal stack is part of a group of focal stacks captured with different viewing angles, said focal stacks of said group of focal stacks being ordered according to an orientation order of their viewing angles, and wherein said at least one processor being configured to encode comprises being further configured to:
 determine an inter-stack image encoding order from said orientation order and from a viewing angle, of said current focal stack, called reference viewing angle,
 encoding at least one pixel of an image of at least another focal stack of said group of focal stacks processed according to said inter-stack image encoding order from the reconstructed image of said current focal stack, said image of said at least another focal stack, called a reference image, being the image selected according to an image sharpness criterion; wherein
 said pixel of said reference image is encoded from said reconstructed image of the current focal stack, captured with said reference viewing angle, and from information representing a disparity between said reference image and said reconstructed image of the current focal stack.

19. A device comprising:
a memory; and
at least one processor coupled to the memory, the at least one processor being configured to:
decode at least a current focal stack comprising a set of images of a same scene focused at different focalization distances from one image to another, wherein said at least one processor being configured to decode the current focal stack comprises being further configured to:
 decode information representing an image of the current focal stack, said image fulfilling an image sharpness criterion,
 reconstruct at least another image of the current focal stack by prediction from at least said decoded image.

20. A non-transitory computer-readable medium comprising a computer program product recorded thereon and capable of being run by a processor, including program code instructions for implementing a method according to claim 1.

* * * * *